Sept. 11, 1934.    G. H. GLEASON ET AL    1,972,883
RECOVERY OF ELEMENTAL SULPHUR
Filed March 31, 1932
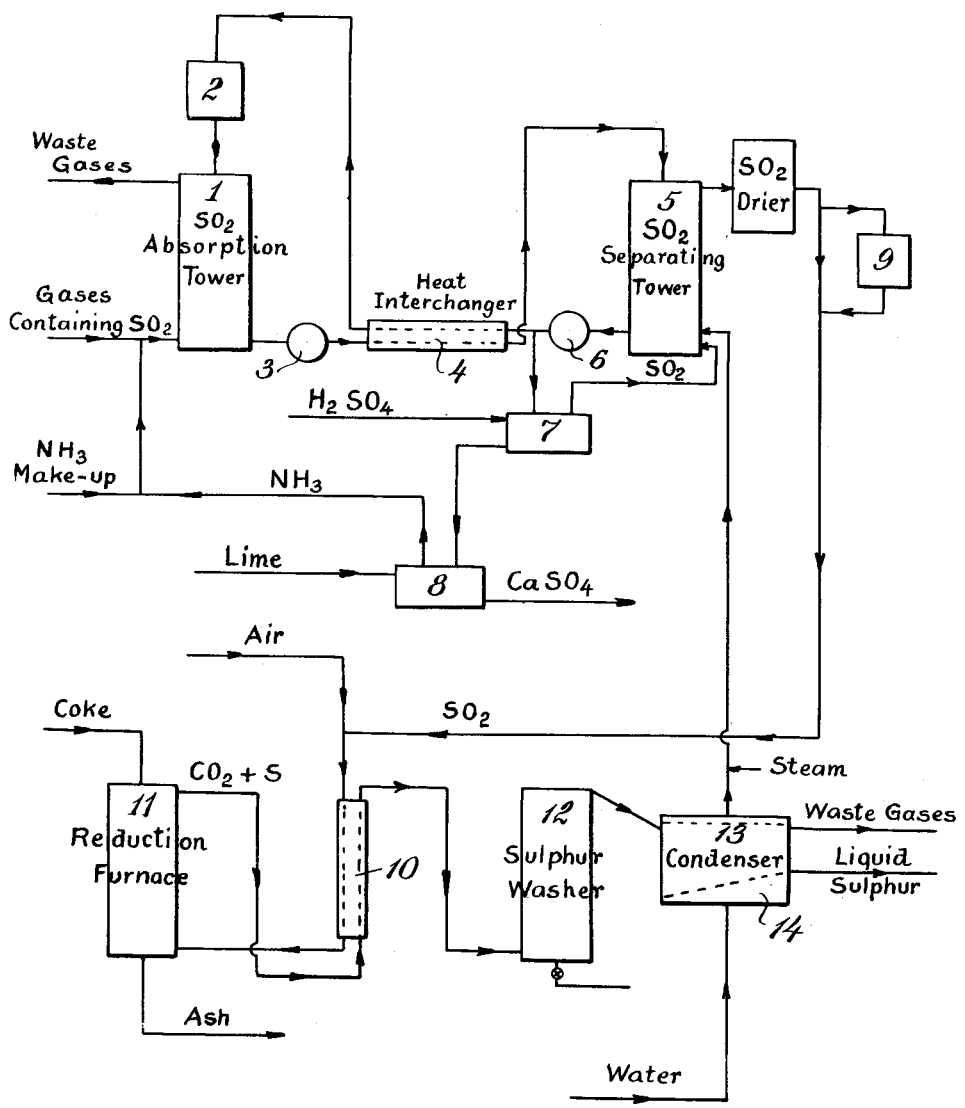
INVENTORS
George H. Gleason
Alfred C. Loonam
BY
Pennie, Davis, Marvin & Edmonds
ATTORNEYS Patented Sept. 11, 1934

1,972,883

UNITED STATES PATENT OFFICE 1,972,883

RECOVERY OF ELEMENTAL SULPHUR

George H. Gleason, Montclair, N. J., and Alfred C. Loonam, Brooklyn, N. Y., assignors to Guggenheim Brothers, New York, N. Y., a copartnership Application March 31, 1932, Serial No. 602,236

14 Claims. (Cl. 23—225)

This invention relates to the recovery of elemental sulphur from gases containing sulphur dioxide, such as smelter gases, converter gases, gaseous metallurgical products etc. The invention aims to provide an improved method of recovering sulphur in elemental form from such gases. The invention is particularly concerned with those processes of sulphur recovery involving the reduction of sulphur dioxide to elemental sulphur by hot carbonaceous material, and aims to provide certain improvements in such processes, notably in the separation of sulphur dioxide from gas mixtures and in the supply of the thus separated sulphur dioxide to the reducing operation, and further in the treatment of the gaseous product of the reducing operation for the separation therefrom and recovery of elemental sulphur in a state of commercial purity. Other objects of the invention are brought out in the course of the following description:

The invention involves the separation of sulphur dioxide from the gas mixture containing it by passing the gas mixture in contact with an appropriate absorbing medium for sulphur dioxide, and subsequently releasing the sulphur dioxide absorbed by the medium to produce a supply of relatively concentrated sulphur dioxide. The absorbing medium is preferably capable of cyclic operation between the stages of sulphur dioxide absorption and release, respectively. Various liquids are available for use as the absorbing medium, as, for example, triethanolamine, aniline, pyridine, and the like, but it is now our preferred practice to use a solution containing ammonium sulphite and ammonium bisulphite in appropriate proportions for the absorption of sulphur dioxide thereby. Where, as in most instances, the release of the absorbed sulphur dioxide is effected by heating the absorbing medium, with regeneration of the medium for further absorption of sulphur dioxide, it is our preferred practice to pass the medium from the sulphur dioxide absorbing stage to the sulphur dioxide releasing stage in heat interchange relation with the reverse passage of the regenerated medium.

The released and relatively concentrated sulphur dioxide, in accordance with the present invention, is passed through a body of hot carbon in conjunction with such an amount of combustion supporting gas, such as air, as to develop by combustion with the carbon sufficient heat to effect the reduction of the sulphur dioxide to elemental sulphur vapor. In the preferred aspect of the invention, the gaseous product of the reducing operation is brought in contact, within a controlled temperature range, with molten sulphur in the course of which certain deleterious contaminants are removed from the gaseous product. The elemental sulphur in the resulting gaseous product is then condensed to molten sulphur, our preferred practice being to rapidly cool the product to a controlled temperature above the melting point of sulphur but not higher than about 150° C.

It has long been known that sulphur can be obtained from gases containing sulphur dioxide by treatment at an elevated temperature with a carbonaceous reducing agent, essentially in accordance with the following reactions:—

$$SO_2+C=CO_2+S$$
$$SO_2+2CO=2CO_2+S$$

However, no entirely satisfactory or successful commercial process utilizing these reactions has heretofore been developed, principally for the following reasons:

(1) The lack of a cheap, compact and efficient cyclic process for concentrating the sulphur dioxide content of the initial gas mixture. Such a process is essential since the sulphur dioxide concentration in the most available gaseous products is seldom higher than 10%. The following methods have heretofore been proposed for concentrating the sulphur dioxide:

a. Mechanical compression to obtain liquid sulphur dioxide. This is too expensive for use in making sulphur or brimstone.

b. Adsorption on activated charcoal etc. This is likely to give poor yields of sulphur dioxide since, in the presence of water and oxygen, sulphuric acid is formed.

c. Absorption in a liquid. This process, while it has been used for making pure sulphur dioxide, has not been carried out cheaply enough to make sulphur production economical. Either the liquid had a low absorptive capacity and therefore required large and expensive installations, or the cost of the absorbent was high owing to loss by volatilization, or because it was not cyclically regenerated.

(2) Difficulty in recovering the sulphur from the gaseous product of the reducing operation. Most of the processes heretofore proposed either do not state how the sulphur is to be recovered or assume its collection in a finely divided solid form, a procedure which not only presents all of the difficulty and expense of separating finely divided solids from gases but yields a product which is not easily handled.

(3) The sulphur prouuct yielded by these heretofore proposed processes is relatively impure and not easily salable until subjected to special purification treatments.

The method of the present invention is free of the foregoing difficulties and objections. Thus, the invention embodies an economical and efficient cyclic process for the concentration of the sulphur dioxide. It provides an improved procedure for the treatment of the gaseous product of the reducing operation as a consequence of which the elemental sulphur vapor is economically and efficiently condensed to molten sulphur of satisfactory commercial purity. In its complete and preferred aspect, the method of the invention comprises the following operations:

(1) A cyclic process for the concentration of sulphur dioxide contained in the gases being treated by absorption in a suitable medium with subsequent treatment (usually heating) to release the concentrated sulphur dioxide and to regenerate the absorbing medium.

(2) Reduction of the released sulphur dioxide by hot carbonaceous material to form elemental sulphur vapor.

(3) Treatment, preferably in the nature of scrubbing or washing, of the gaseous product of the reducing operation to remove objectionable or deleterious contaminants.

(4) Condensation (from the purified gaseous product obtained in the foregoing operation) of elemental sulphur vapor to liquid or molten sulphur.

(5) Utilization of the heat dissipated in condensation of the sulphur vapor for the purpose of liberating the concentrated sulphur dioxide from the medium in which it is absorbed in the first operation of the process.

As a result of the foregoing operations, we obtain in the practice of the invention a liquid or molten sulphur product in a completely coalesced and thoroughly fluid form at such a temperature that it is not readily oxidized or subject to loss by vaporization. It can be easily cast into any suitable form, and is equal, if not superior, to the present day grades of commercial sulphur or brimstone.

Description of Various Operations

Operation No. 1

In this operation the gaseous mixture containing sulphur dioxide (say for example, up to 10% $SO_2$) is passed through an absorption apparatus, such as a packed tower, containing a medium capable of absorbing sulphur dioxide. As previously stated, it is our preferred practice to employ as such medium an aqueous solution containing ammonium sulphite and ammonium bisulphite in appropriate proportions for the absorption of sulphur dioxide. In such a solution, the proportions of the two salts is such that the vapor pressure of the sulphur dioxide is very low. The gas mixture and the liquid absorbing medium are passed counter-currently through the absorption apparatus. The sulphur dioxide is practically completely removed from the gases which pass to waste from the top of the apparatus.

The absorbing medium (charged with absorbed $SO_2$) passes from the base of the absorption apparatus through a heat interchanger, where it is heated by the returning depleted or regenerated medium, to the top of the sulphur dioxide separating apparatus, such as a packed tower. In the separating apparatus, the medium is heated to the boiling point to drive off the sulphur dioxide which, passing upwardly, gives up part of its heat to the incoming medium. The heat for this operation may conveniently be supplied by steam from the condenser in which the elemental sulphur vapor is being condensed to molten sulphur.

The hot depleted or regenerated medium passes out at the bottom of the separating apparatus and through the aforementioned heat interchanger where it heats the incoming medium charged with absorbed $SO_2$, and is then pumped to a storage tank from which it is delivered to the absorption apparatus for use again. The sulphur dioxide obtained from the separating apparatus is relatively concentrated and pure except for water vapor and some carbon dioxide (if this is present in the gas being treated).

The circulating solution of ammonium sulphite and ammonium bisulphite slowly becomes fouled by the presence of sulphate formed by slow oxidation of the solution by the free oxygen in the gases. Depending on the source of the gases being treated, and the efficiency of the preliminary purification, the solution may also absorb sulphur, sulphur trioxide, arsenic, selenium, chlorine, etc., which form non-volatile ammonium compounds having small absorptive capacity for sulphur dioxide. To maintain these compounds at reasonably low concentrations, we bleed off a portion of the circulating solution as it leaves the base of the separating apparatus and add sulphuric acid thereto. This liberates sulphur dioxide which is returned to the separating apparatus. The solution of ammonium sulphate is then treated with lime to liberate ammonia which is returned to the system at the base of the absorption apparatus. The ammonia required to make up losses is also added at the base of the absorption apparatus. These losses of ammonia are relatively small, the only sensible loss being that in the solution carried out as spray in the exhaust or waste gases from the top of the absorption apparatus.

In the actual practice of the invention, we have found it advantageous to use a solution which after boiling to release the sulphur dioxide is substantially saturated with the residual ammonium salts at the minimum temperature reached in the cycle. Generally speaking, the solution may advantageously contain at 25° C. approximately 100–200 grams per liter of ammonium sulphite and approximately 700–800 grams per liter of ammonium bisulphite. We have secured excellent results in practice with a solution containing approximately 147 grams per liter of ammonium sulphite and approximately 760 grams per liter of ammonium bisulphite. This solution has a boiling point of 113–115° C. and has a sulphur dioxide pressure of considerably less than 3 mm. at 25° C. It absorbed and gave up 130 grams of sulphur dioxide per liter when used to treat a gas containing 6% $SO_2$. This is equivalent to a flow of only 9.5 gallons of solution through the absorption apparatus for every 1000 cubic feet of gas passing. However, at a higher temperature of operation a greater concentration of ammonia must be used, while at a temperature lower than 25° C. a less concentration of ammonia is necessary.

Sulphur dioxide obtained from this operation may be dried by any of the several known methods. After drying, such part of the sulphur dioxide as is not directly delivered to the reducing operation may be stored in a gasometer or may be liquefied and stored in tanks.

Operation No. 2

The sulphur dioxide gas obtained from the preceding operation is reduced by hot carbon in an appropriate reduction furnace. Sufficient combustion supporting gas, such as air, is added to or along with the sulphur dioxide gas to maintain by combustion with the carbon a temperature suitable for efficient operation.

We have found a vertical shaft furnace consisting of a steel shell alined with insulating brick and refractory material admirably adapted for the practice of the reducing operation. Sulphur dioxide and air, approximately in the ratio of 3 to 2 respectively, are passed through a heat-interchanger in which the incoming gasses are heated by the outgoing gaseous product of the reducing operation. After leaving the heat interchanger, the incoming gases are passed into the bottom of the reducing furnace where the carbon is burned to carbon dioxide and the sulphur dioxide is reduced to elemental sulphur vapor. A temperature of about 850° C. is maintained where practically complete conversion to carbon dioxide and elemental sulphur is obtained. There is substantially no evidence of side reactions leading to the formation of carbon monoxide, carbon oxysulphide or carbon bisulphide taking place under these conditions of operation. It is our preferred practice to use as the carbonaceous reducing agent dried coke or about one-half inch to one inch mesh; which is fed in at the top of the furnace. The gaseous product of the reducing operation, containing elementary sulphur vapor emerges from an opening in the otherwise closed top of the reducing furnace, and passes through the heat interchanger (last mentioned) to the washer.

Operation No. 3

Gaseous products containing elemental sulphur which are to be treated for the recovery of the sulphur may also contain materials which, if allowed to pass to the recovery apparatus, would separate out with and contaminate the sulphur product. These contaminants vary with the source of the gaseous product and may be present in the solid, liquid or vapor state. For example, the gaseous product from the reduction of sulphur dioxide by hot carbonaceous material may contain volatile tarry matters and solid particles of reducing agent. To remove such contaminants from the gaseous product of the reducing operation, it is now our preferred practice to use a washer or scrubber in which the gaseous product comes in contact with liquid sulphur which will collect the solid particles and condense the tar and other volatile compounds. The washer may advantageously be a tower of suitable proportions, made of steel (suitably insulated) and filled with a packing such as coke, Raschig rings, "Chemico" rings, or the like, to provide a large gas contact surface over which liquid sulphur flows. The gas inlet is at the bottom and the gas outlet at the top of the tower. The sulphur used for washing may be introduced at the top of the tower as a spray or in fine streams, or the incoming gases may be brought in contact with liquid sulphur in a reservoir at the bottom of the tower at a temperature high enough to permit them to entrain an adequate amount of sulphur vapor, which vapor is allowed to condense and return to the reservoir by causing the temperature to decrease as the gases proceed upward toward the outlet. By the latter procedure we cool the gases, obviate the necessity for a circulating pump, bring comparatively clean sulphur into contact with the gases, and secure the benefits of the fact that even fine particles or droplets in suspension act as condensation centers and may be so laden with liquid sulphur that they settle out.

While it is desirable that the exit gases be at such a temperature that they contain the same amount of sulphur as the incoming gases thereby maintaining a constant amount of sulphur in the washer, actual conditions of operation may make this impracticable. In such cases, the amount of liquid sulphur in the washer will change and it will be necessary to add or bleed off sulphur from time to time.

The incoming gases may be bubbled through the liquid sulphur to insure intimate contact. If the incoming gases do not contain enough heat, it may be necessary to supply external heat principally at the bottom to secure circulation of sulphur. Part of the circulating sulphur is drawn off from time to time as the amount and nature of the collected contaminants may warrant and is replaced by clean sulphur. In actual practice, we have found that very satisfactory purifications is obtained with an incoming temperature of the gases such that the temperature of the reservoir of liquid sulphur at the bottom of the washer is from 350° to 450° C., and the washer is so designed and operated that the gases exit at its top at a temperature approximately 100° C. lower.

The following example illustrates the efficiency of the washing operation: A collection of sulphur from the gaseous product of a furnace, in which sulphur dioxide was reduced by coke, yielded a product which, although containing 98.8% S, was dark-colored and hence of inferior marketability. The inclusion of the washer in the same installation resulted in raising the sulphur content of the product to better than 99.5%, and the color of the product was substantially identical with that of present day commercial grades of sulphur or brimstone.

From the top of the washer the gases are conducted to the sulphur condenser.

Operation No. 4

The most convenient form in which to recover sulphur is as a liquid. This has presented certain difficulties, however, for the following reasons:

(1) Sulphur vapor at temperatures below its normal boiling point polymerizes to $S_6$ and $S_8$, thereby greatly lowering its partial pressure even in a comparatively rich gas.

(2) Liquid sulphur, in the temperature range between 160° and 225° C., is extremely viscous, so much so, in fact, that at 190° C. a vessel containing it can be inverted without the sulphur running out. While it is fluid above this temperature range, its vapor pressure is comparatively high and it is spontaneously inflammable.

(3) The very low thermal conductivity of sulphur itself.

The most favorable temperatures for condensing sulphur are, therefore, in the lower fluid temperature range of 114°–150° C. To secure collection of the condensed sulphur in this temperature range, the sulphur vapor (or gases containing sulphur vapor) must be cooled rapidly to below 150° C., and the resulting cooled vapor or droplets of sulphur appropriately collected. The former condition may be obtained by providing suitable arrangements and conditions for efficient heat transfer and the latter by bringing the gases in contact with a powerful solvent for sulphur.

In accordance with our present invention, the first condition is attained by bringing the gases into contact with efficiently cooled surfaces of large area, thereby rapidly cooling the gases below the viscous temperature range of liquid sulphur. The second condition is attained by bubbling the resulting sulphur vapor bearing gases through liquid sulphur maintained at a temperature in the lower fluid range.

We have found that the practical attainment of these conditions is conveniently accomplished by surrounding the condensing chamber with a liquid having a boiling point within the lower fluid sulphur temperature range, thereby securing rapid dissipation of heat on one side of the chamber walls. Monochlorobenzene (the boiling point of which is about 132° C.), or water under a pressure of ten to thirty pounds per square inch are appropriate liquids for the purpose.

We have found it desirable to construct the sulphur condenser so that the gases bubble through liquid sulphur one or more times, thereby insuring intimate contact between gas and liquid and preventing the formation of an insulating gas film on the surface of the liquid. The depth of liquid through which the gas passes need not be very great, 4½ inches being ample, and several passes through shallow layers are to be preferred to one pass through a greater depth. Following this procedure, we have found it practicable to collect over 94% of the sulphur content of a gas mixture containing only 6.5% sulphur by volume (as $S_8$).

*Operation No. 5*

The steam or other heat absorbing medium surrounding the condenser is conducted to the apparatus in which sulphur dioxide is released from the medium in which absorbed (Operation No. 1). In this manner, the heat dissipated in the condensation of the sulphur vapor is rendered available and utilized in the release of sulphur dioxide from its absorbing medium.

In the single figure of the accompanying drawing, there is diagrammatically represented a conventional flow-sheet of a system for the practice of our invention in its complete and preferred form.

Referring to the drawing, the gases containing sulphur dioxide, such as smelter gases, converter gases or the like, enter the base of an absorption apparatus or tower 1 where they come in contact with the absorbing medium, such as the ammonium sulphite-bisulphite solution delivered to the tower from a storage tank 2. The gases pass upwardly through the tower in contact with the descending solution, and reaching the top of the tower the exhaust gases pass to waste. The solution with its absorbed sulphur dioxide is drawn by a pump 3 from the bottom of the tower 1 and passes through a heat interchanger 4 to the top of the separating apparatus or tower 5, where it is heated to boiling by steam (or other appropriate heating medium) from the jacket (14) of the sulphur condenser. The sulphur dioxide released or liberated in the tower 5 passes out at the top of the tower, and the depleted solution is withdrawn from the bottom of the tower by a pump 6 and passes through the heat interchanger 4 back to the storage tank 2. The towers 1 and 5 are filled with an appropriate packing, such as coke, Raschig rings, "Chemico" rings, or the like.

A tap on the discharge side of the pump 6 permits drawing a portion of the depleted solution into a tank 7 where it is treated with sulphuric acid. The sulphur dioxide liberated by the reaction taking place in the tank 7 is returned to the tower 5. The residual solution from the tank 7 is conveyed to a tank 8 where it is treated with lime, thereby liberating ammonia which is conveyed back to the base of the absorption tower 1 along with the necessary ammonia make-up. The residue from the tank 8, consisting for the most part of calcium sulphate, is discharged to waste.

The sulphur dioxide from the separating tower 5 passes through an appropriate dryer from which it is conducted either to a gasometer 9 for storage or directly to a heat interchanger 10. Prior to its entrance into the heat interchanger, the sulphur dioxide is admixed with an appropriate volume of air or other suitable combustion supporting gas. From the heat interchanger 10, the mixture of sulphur dioxide and combustion supporting gases passes to the base of a reduction furnace 11, and up through a body of incandescent carbon, such as coke or other appropriate carbonaceous material. The carbonaceous material is introduced as required into the top of the furnace 11, and ash is removed as necessary from the bottom of the furnace. Within the furnace 11, the combustion supporting gas oxidizes or burns a sufficient quantity of the carbon to develop and maintain the necessary temperature for the reduction of sulphur dioxide to elemental sulphur by reaction with the incandescent carbon.

The gaseous product of the reducing operation, consisting for the most part of carbon dioxide and elemental sulphur vapor, passes from the top of the furnace 11 through the heat interchanger 10 to the washer or scrubber 12, where impurities and contaminants are scrubbed out of the gases by liquid sulphur. The washer is provided at its bottom with an outlet or bleed pipe through which molten sulphur may be withdrawn, as when an excess of sulphur accumulates or the sulphur becomes too contaminated for continued efficient use. The thus purified gases pass from the washer 12 to the sulphur condenser 13 where the sulphur vapor is condensed as liquid and appropriately drawn off. The exhaust gases of the condenser pass to waste. The condenser is maintained at the temperature required for efficient condensation by means of a surrounding jacket 14 into which water in appropriate amount is introduced. As hereinbefore mentioned, the steam developed in the jacket 14 is utilized in heating the solution in the separating tower 5.

The sulphur washer 12 may advantageously be of the construction described and claimed in our copending application, Ser. No. 602,238, filed March 31, 1932, and the condenser 13 may advantageously be of the construction described and claimed in our copending application Ser. No. 602,237, filed March 31, 1932.

We claim:

1. The method of recovering sulphur from a gas mixture containing sulphur dioxide which comprises passing the gas mixture in contact with a medium capable of absorbing sulphur dioxide, subsequently releasing the sulphur dioxide absorbed by the medium and thereby producing a supply of relatively concentrated sulphur dioxide, passing the relatively concentrated sulphur dioxide through a body of hot carbon in conjunction with such an amount of combustion supporting gas as to develop by combustion with the carbon sufficient heat to effect the reduction of the sulphur dioxide to elemental sulphur vapor, passing the gaseous product of the reducing operation in contact with molten sulphur in the course of which certain deleterious contaminants are removed from the gaseous product, and condensing the sulphur vapor in the resulting gaseous product by rapidly cooling the product to a controlled temperature above the melting point of sulphur but not higher than about 150° C.

2. The method of recovering sulphur from a gas mixture containing sulphur dioxide which comprises passing the gas mixture in contact with a medium capable of absorbing sulphur dioxide, subsequently releasing the sulphur dioxide absorbed by the medium and thereby producing a supply of relatively concentrated sulphur dioxide, passing the relatively concentrated sulphur dioxide through a body of hot carbon in conjunction with such an amount of combustion supporting gas as to develop by combustion with the carbon sufficient heat to effect the reduction of the sulphur dioxide to elemental sulphur vapor, passing the gaseous product of the reducing operation in contact with molten sulphur at a temperature of approximately 350–450° C. in the course of which certain deleterious contaminants are removed from the gaseous product, and treating the resulting gaseous product to condense the elemental sulphur therein.

3. The method of recovering sulphur from a gas mixture containing sulphur dioxide which comprises passing the gas mixture in contact with a solution containing ammonium sulphite and ammonium bisulphite in appropriate proportions for the absorption of sulphur dioxide by the solution, subsequently heating the solution and thereby releasing sulphur dioxide, passing the released sulphur dioxide through a body of hot carbon in conjunction with such an amount of combustion supporting gas as to develop by combustion with the carbon sufficient heat to effect the reduction of the sulphur dioxide to elemental sulphur vapor, passing the gaseous product of the reducing operation in contact with molten sulphur in the course of which certain deleterious contaminants are removed from the gaseous product, and treating the resulting gaseous product to condense the elemental sulphur therein.

4. The method of recovering sulphur from a gas mixture containing sulphur dioxide which comprises passing the gas mixture in contact with a solution containing ammonium sulphite and ammonium bisulphite in appropriate proportions for the absorption of sulphur dioxide by the solution, subsequently heating the solution and thereby releasing sulphur dioxide, passing the released sulphur dioxide through a body of hot carbon in conjunction with such an amount of combustion supporting gas as to develop by combustion with the carbon sufficient heat to effect the reduction of the sulphur dioxide to elemental sulphur vapor, passing the gaseous product of the reducing operation in contact with molten sulphur at a temperature of approximately 350–450° C. in the course of which certain deleterious contaminants are removed from the gaseous product, and condensing the sulphur vapor in the resulting gaseous product by rapidly cooling the product to a controlled temperature above the melting point of sulphur but not higher than about 150° C.

5. The method of recovering sulphur from a gas mixture containing sulphur dioxide which comprises passing the gas mixture in contact with a solution containing (at 25° C.) approximately 100–200 grams per liter of ammonium sulphite and approximately 100–800 grams per liter of ammonium bisulphite and thereby absorbing sulphur dioxide in the solution, subsequently heating the solution and thereby releasing sulphur dioxide and regenerating the absorption solution, passing the released sulphur dioxide through a body of hot carbon in conjunction with such an amount of combustion supporting gas as to develop by combustion with the carbon sufficient heat to effect the reduction of the sulphur dioxide to elemental sulphur vapor, treating the resulting gaseous product of the reducing operation to condense the elemental sulphur vapor therein, and utilizing the regenerated solution for the absorption of additional sulphur dioxide.

6. The method of recovering sulphur from a gas mixture containing sulphur dioxide which comprises passing the gas mixture in contact with a solution containing ammonium sulphite and ammonium bisulphite in appropriate proportions for the absorption of sulphur dioxide by the solution, subsequently heating the solution and thereby releasing sulphur dioxide and regenerating solution for the further absorption of sulphur dioxide, passing the solution from the sulphur dioxide absorbing stage to the sulphur dioxide releasing stage in heat interchange relation with the reverse passage of the regenerated solution, passing sulphur dioxide released as aforesaid through a body of hot carbon in conjunction with such an amount of combustion supporting gas as to develop by combustion with the carbon sufficient heat to effect the reduction of the sulphur dioxide to elemental sulphur vapor, treating the resulting gaseous product of the reducing operation to condense the elemental sulphur vapor therein, and utilizing the regenerated solution for the absorption of additional sulphur dioxide.

7. The method of recovering sulphur from a gas mixture containing sulphur dioxide which comprises passing the gas mixture in contact with a medium capable of absorbing sulphur dioxide, subsequently releasing the sulphur dioxide absorbed by the medium and thereby producing a supply of relatively concentrated sulphur dioxide, passing the relatively concentrated sulphur dioxide through a body of hot carbon in conjunction with such an amount of combustion supporting gas as to develop by combustion with the carbon sufficient heat to effect the reduction of the sulphur dioxide to elemental sulphur vapor, passing the gaseous product of the reducing operation in heat interchange relation with gas supplied to the reducing operation, then passing the gaseous product in contact with molten sulphur maintained at a temperature of approximately 350–450° C. by the heat derived from the gaseous product in the course of which certain deleterious contaminants are removed from the gaseous product, and treating the resulting gaseous product to condense the elemental sulphur therein.

8. The method of recovering sulphur from a gas mixture containing sulphur dioxide which comprises passing the gas mixture in contact with a medium capable of absorbing sulphur dioxide, subsequently heating the medium and thereby releasing sulphur dioxide and regenerating the medium for the further absorption of sulphur dioxide, passing the medium from the sulphur dioxide absorbing stage to the sulphur dioxide releasing stage in heat interchange relation with the reverse passage of the regenerated medium, passing sulphur dioxide released as aforesaid through a body of hot carbon in conjunction with such an amount of combustion supporting gas as to develop by combustion with the carbon sufficient heat to effect the reduction of the sulphur dioxide to elemental sulphur vapor, treating the resulting gaseous product of the reducing operation to condense the elemental sulphur vapor therein, and utilizing the regenerated medium for the absorption of additional sulphur dioxide.

9. The method of recovering sulphur from a gas mixture containing sulphur dioxide which comprises passing the gas mixture in contact with a medium capable of absorbing sulphur dioxide, subsequently heating the medium and thereby releasing sulphur dioxide, passing sulphur dioxide released as aforesaid through a body of hot carbon in conjunction with such an amount of combustion supporting gas as to develop by combustion with the carbon sufficient heat to effect the reduction of the sulphur dioxide to elemental sulphur vapor, treating the resulting gaseous product of the reducing operation to condense the elemental sulphur vapor therein, and utilizing the heat dissipated in the condensation of the sulphur vapor for heating the sulphur dioxide absorbing medium to release sulphur dioxide absorbed thereby as aforesaid.

10. The method of recovering sulphur from a gas mixture containing sulphur dioxide which comprises passing the gas mixture in contact with a solution containing ammonium sulphite and ammonium bisulphite in appropriate proportions for the absorption of sulphur dioxide by the solution, subsequently heating the solution and thereby releasing sulphur dioxide, passing the released sulphur dioxide through a body of hot carbon in conjunction with such an amount of combustion supporting gas as to develop by combustion with the carbon sufficient heat to effect the reduction of the sulphur dioxide to elemental sulphur vapor, treating the resulting gaseous product of the reducing operation to condense the elemental sulphur vapor therein, and utilizing the heat dissipated in the condensation of the sulphur vapor for heating the sulphur dioxide absorbing solution as aforesaid.

11. The method of recovering sulphur from a gas mixture containing sulphur dioxide which comprises passing the gas mixture in contact with a medium capable of absorbing sulphur dioxide, subsequently heating the medium and thereby releasing sulphur dioxide and regenerating the medium for the further absorption of sulphur dioxide, passing the medium from the sulphur dioxide absorbing stage to the sulphur dioxide releasing stage in heat interchange relation with the reverse passage of the regenerated medium, passing sulphur dioxide released as aforesaid through a body of hot carbon in conjunction with such an amount of combustion supporting gas as to develop by combustion with the carbon sufficient heat to effect the reduction of the sulphur dioxide to elemental sulphur vapor, passing the gaseous product of the reducing operation in heat interchange relation with gas supplied to the reducing operation, treating the gaseous product of the reducing operation to condense the elemental sulphur vapor therein, and utilizing the heat dissipated in the condensation of the sulphur vapor for heating the sulphur dioxide absorbing medium to release sulphur dioxide absorbed thereby as aforesaid.

12. The method of recovering sulphur from a gas mixture containing sulphur dioxide which comprises passing the gas mixture in contact with a solution containing ammonium sulphite and ammonium bisulphite in appropriate proportions for the absorption of sulphur dioxide by the solution, subsequently heating the solution and thereby releasing sulphur dioxide and regenerating solution for the further absorption of sulphur dioxide, passing the solution from the sulphur dioxide absorbing stage to the sulphur dioxide releasing stage in heat interchange relation with the reverse passage of the regenerated solution, passing sulphur dioxide released as aforesaid through a body of hot carbon in conjunction with such an amount of combustion supporting gas as to develop by combustion with the carbon sufficient heat to effect the reduction of the sulphur dioxide to elemental sulphur vapor, passing the gaseous product of the reducing operation in heat interchange relation with gas supplied to the reducing operation, then passing the gaseous product in contact with molten sulphur in the course of which certain deleterious contaminants are removed therefrom, and treating the resulting gaseous product to condense the elemental sulphur therein.

13. The method of recovering sulphur from a gas mixture containing sulphur dioxide which comprises passing the gas mixture in contact with a medium capable of absorbing sulphur dioxide, subsequently releasing the sulphur dioxide absorbed by the medium and thereby producing a supply of relatively concentrated sulphur dioxide, passing the relatively concentrated sulphur dioxide through a body of hot carbonaceous material in conjunction with such an amount of combustion supporting gas as to develop by combustion with the carbonaceous material sufficient heat to effect the reduction of the sulphur dioxide to elemental sulphur vapor, rapidly cooling the gaseous product of the reducing operation through the temperature range in which molten sulphur is viscous to a temperature below 150° C., and passing the resulting cooled gaseous product through one or more bodies of molten sulphur.

14. The method of recovering sulphur from a gas mixture containing sulphur dioxide which comprises passing the gas mixture in contact with a solution containing ammonium sulphite and ammonium bisulphite in appropriate proportions for the absorption of sulphur dioxide by the solution, subsequently heating the solution and thereby releasing sulphur dioxide, passing the released sulphur dioxide through a body of hot carbon in conjunction with such an amount of combustion supporting gas as to develop by combustion with the carbon sufficient heat to effect the reduction of the sulphur dioxide to elemental sulphur vapor, rapidly cooling the gaseous product of the reducing operation through the temperature range in which molten sulphur is viscous to a temperature range in which molten sulphur is viscous to a temperature below 150° C., and passing the resulting cooled gaseous product through one or more bodies of molten sulphur.

GEORGE H. GLEASON.
ALFRED C. LOONAM.

CERTIFICATE OF CORRECTION.

Patent No. 1,972,883.   September 11, 1934.

GEORGE H. GLEASON, ET AL.

It is hereby certified that error appears in the printed specification of the above numbered patent requiring correction as follows: Page 3, line 31, for "or" read of; and line 99, for "purifcations" read purification; page 5, line 78, claim 5, for "100-800" read 700-800; page 6, lines 140 and 141, claim 14, strike out the words "to a temperature range in which molten sulphur is viscous"; and that the said Letters Patent should be read with these corrections therein that the same may conform to the record of the case in the Patent Office.

Signed and sealed this 16th day of October, A. D. 1934.

Leslie Frazer (Seal)   Acting Commissioner of Patents.